United States Patent [19]

Meyers

[11] Patent Number: 5,113,596
[45] Date of Patent: May 19, 1992

[54] T-SQUARE ACCESSORY FOR TAPE MEASURE

[76] Inventor: Jack G. Meyers, P.O. Box 537, Tombstone, Ariz. 85638

[21] Appl. No.: 713,301

[22] Filed: Jun. 11, 1991

[51] Int. Cl.⁵ .............................................. G01B 3/10
[52] U.S. Cl. ...................................... 33/770; 33/368; 33/760; 33/759
[58] Field of Search ................. 33/770, 768, 769, 766, 33/761, 42, 464, 474, 479, 480, 481

[56] References Cited

U.S. PATENT DOCUMENTS

| | | | |
|---|---|---|---|
| 2,563,674 | 8/1951 | Coots | 33/761 X |
| 3,169,320 | 2/1965 | Currie | 33/613 X |
| 3,823,481 | 7/1974 | Chapin | 33/761 X |
| 3,834,033 | 9/1974 | Pinkard | 33/761 X |
| 4,200,984 | 5/1980 | Fink | 33/427 X |
| 4,967,482 | 11/1990 | Hoover et al. | 33/760 |

FOREIGN PATENT DOCUMENTS 3415317  10/1985  Fed. Rep. of Germany ........ 33/761

Primary Examiner—Harry N. Haroian
Attorney, Agent, or Firm—Antonio R. Durnado; Harry M. Weiss

[57] ABSTRACT

A T-square attachment that is designed for use in conjunction with a conventional tape measure. The square is attached to the case of the tape measure in such a way that it forms a right angle with the extended tape, so as to enable a user to mark two parallel straight lines in a perpendicular direction at selected distances measured from the end of the tape. In order to complement the size of standard lumber used in construction in the United States, the ruler portion of the T-square is approximately 1 and ½ inches wide and about 8 inches long. These dimensions enable a user to mark both top and bottom plates with two parallel lines to delineate the exact location for the placement of each stud. A centrally located notch in the ruler is provided to line it up with the desired markings on the blade of the extended tape measure.

5 Claims, 1 Drawing Sheet

T-SQUARE ACCESSORY FOR TAPE MEASURE

BACKGROUND OF THE INVENTION

1. Field of the Invention

This invention is related in general to the fields of carpentry tools and their accessories. In particular, the invention provides a T-square attachment designed for use with a standard tape measure to assist in the framing of conventional stud walls and in similar construction applications.

2. Description of the Prior Art

People have been framing walls for a long time by assembling the various pieces of lumber on the ground and then raising the structure so formed to tie into similarly assembled adjacent portions in an upright position. In the process of framing a wall, carpenters typically start by laying two identical pieces of construction grade lumber (corresponding to the top and bottom plate of the wall) flat against each other on a plain surface and then marking each piece at the points corresponding to the desired locations for the studs to be installed between them. Marking the top and bottom plate normally involves the use of a conventional retractable tape measure hooked over the end of one of the plates and extended over its length. Marks are made along that plate at measured distances from the end and are then transferred to the other plate with the help of a square or even by naked eye approximation. In either case, usually only one mark is made on each plate for every stud location. Thus, when the plates are separated and the studs are actually fastened between them, the carpenter has no indication of whether each mark corresponds to the correct location for the right, left or center of the stud. As a result, studs are often fastened inconsistently (typically on either side of the marks) and therefore become difficult to find after they are covered with sheathing. In fact, even when the studs are installed uniformly (that is, all on the same side of the marks), they are not in the precise planned location because of the offset resulting from the arbitrary choice made by placing each stud either on the right or the left of the marks on the plates, rather than along their centerline. The resulting difficulty in locating the studs behind a wall is all too familiar to anyone who has needed to find a strong support to anchor a heavy weight on a plasterboard wall.

One way to correct this problem would be to carefully plan the sequence of steps to insure that the centerline of each stud is perfectly lined up with its desired location. For example, if the studs were to be spaced 16 inches apart, marks would be made on both the top and bottom plate every 16 inches from the centerline of the first stud, repeated throughout the length of each plate. Then, each stud would be positioned and fastened so that its centerline coincides with corresponding marks on the plates, resulting in a sequence of studs exactly 16 inches apart from one another, which could then be easily located by precise measurement after the wall is completed.

In practice, though, this exact procedure is not followed and locating studs after the wall is finished remains a recurring problem. Therefore, there exists a need for a simple tool that can be used to improve the method of marking the top and bottom plates during construction to insure that the studs are located where planned.

BRIEF SUMMARY OF THE INVENTION

One objective of this invention is the development of a tool that enables a carpenter to easily locate the correct sites for installing studs along a top and a bottom plate by identifying and marking on each plate two parallel lines within which each stud end is supposed to fit.

Another objective of the invention is a device that permits the simultaneous marking of the top and bottom plates of a wall during construction, thus eliminating the need for transferring the measured marks from one plate to the other.

A further goal of the invention is a tool that can be used in conjunction with and as an accessory of a conventional tape measure.

A final objective is the easy and economical manufacture of the device according to the above stated criteria. This is achieved by using commercially available components and materials, modified only to the extent necessary to fit the requirements of the invention.

Therefore, according to these and other objectives, the present invention describes a T-square attachment for a conventional tape measure. The square is attached to the case of the tape measure in such a way that it forms a right angle with the extended tape, so as to enable a user to mark two parallel straight lines in a perpendicular direction at selected distances measured from the end of the tape. In order to complement the size of standard lumber used in construction in the United States, the ruler portion of the T-square is approximately 1 and ¾ inches wide and about 8 inches long. These dimensions enable a user to mark both top and bottom plates with two parallel lines to delineate the exact location for the placement of each stud. A centrally located notch in the ruler is provided to line it up with the desired markings on the blade of the extended tape measure.

Various other purposes and advantages of the invention will become clear from its description in the specifications that follow and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

DETAILED DESCRIPTION OF THE INVENTION

This invention consists of the application of simple mechanical principles in combination with known structural components to achieve a practical and economical solution to an irritating problem. The main point of the invention lies in the recognition of the fact that the problem can easily be solved by combining the function of a standard T-square with that of a tape measure. Thus, the device of this invention is generally shaped like a T-square that includes a receptacle for holding the case of a standard size retractable tape measure in the crosspiece of the square. As the blade of the tape measure is extracted from its case and extended over a distance for measurements, the ruler remains perpendicular to it and available for marking a set of parallel lines, both perpendicular to the tape, at the desired points.

Figure 1:
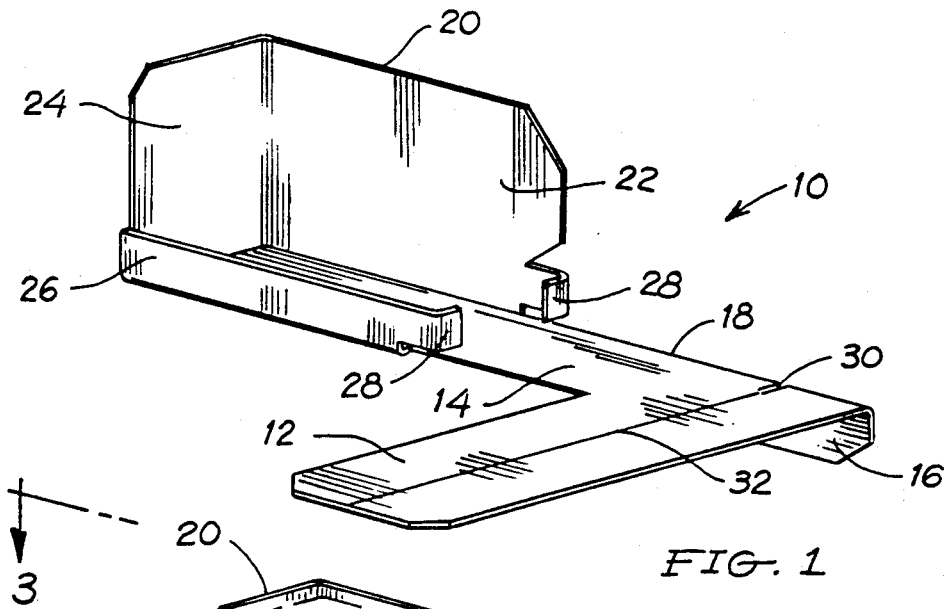
FIG. 1 is a perspective view of the T-square tape measure attachment of this invention.

Referring now to the drawings, wherein like parts are designated throughout with like numerals, FIG. 1 shows a perspective view of the T-square attachment 10 of this invention. The attachment comprises a ruler portion 12 extending at 90 degrees from a crosspiece or head portion 14 to form a structure generally referred to as a T-square. Although the apparatus of FIG. 1 could be more precisely described as showing the ruler and head in an L configuration, it is herein described in terms of a T-square because the latter better reflects the functional relationship of the two structural members. In fact, if the head or crosspiece portion were to be extended to form a true T geometry, the resulting configuration would be functionally equivalent to that shown in FIG. 1 for the purposes of this invention.

Figure 3:
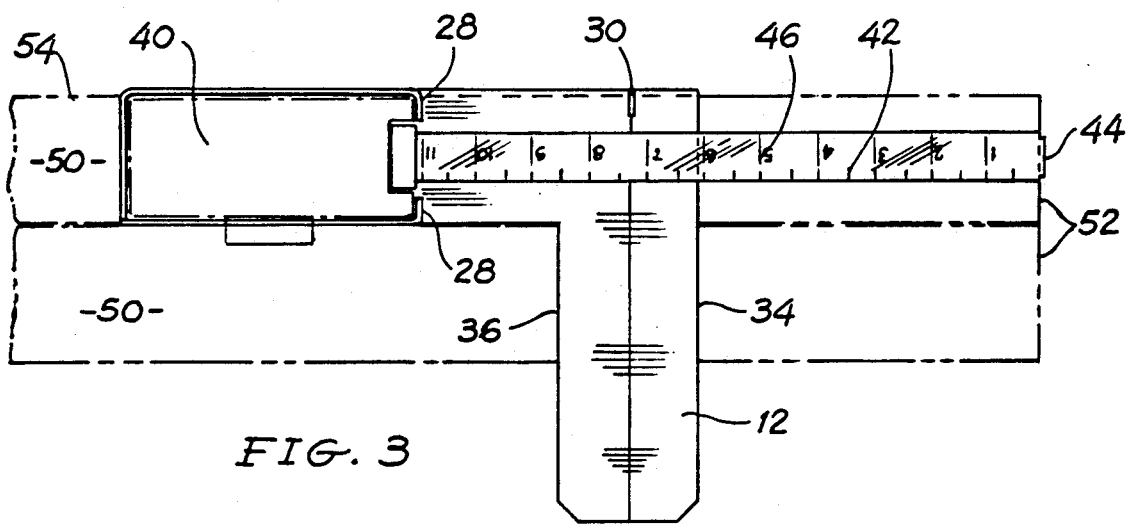
FIG. 3 is a top view of the same apparatus as used to mark the top and bottom plates in the construction of a wall.

The head 14 includes a lip 16 at right angle with and along the length of its top edge 18 to provide a support for sliding and holding the device in firm position against the edge of a straight surface, such as a piece of construction lumber (as seen in FIG. 3). A receptacle 20 is provided on the side of the head 14 opposite to the ruler for receiving and holding in place a standard retractable tape measure, such as, for example, the well known product marketed in different sizes by the Stanley Tool Company under the trademark "Powerlock." The receptacle of FIG. 1 is designed for the shape of a Stanley case and includes a left side 22, a back side 24 and a right side 26, of shapes and dimensions suitable for housing the tape measure case snugly. The left and right sides include curved portions that form hooks 28 for snapping and holding the tape measure in place. Of course, it would be obvious for one skilled in the art to modify the receptacle 20 to equivalent shapes to accommodate other tape measure geometries.

A notch or mark 30 is placed at the top of and along th centerline 32 of the ruler 12 in order to provide a reference mark for reading distance measurements on the tape extended from the receptacle 20, as illustrated below. Although not absolutely necessary to practice their invention, it may be helpful to actually mark the centerline 32 on the ruler to project the exact reading on the tape measure along its entire length.

Figure 2:
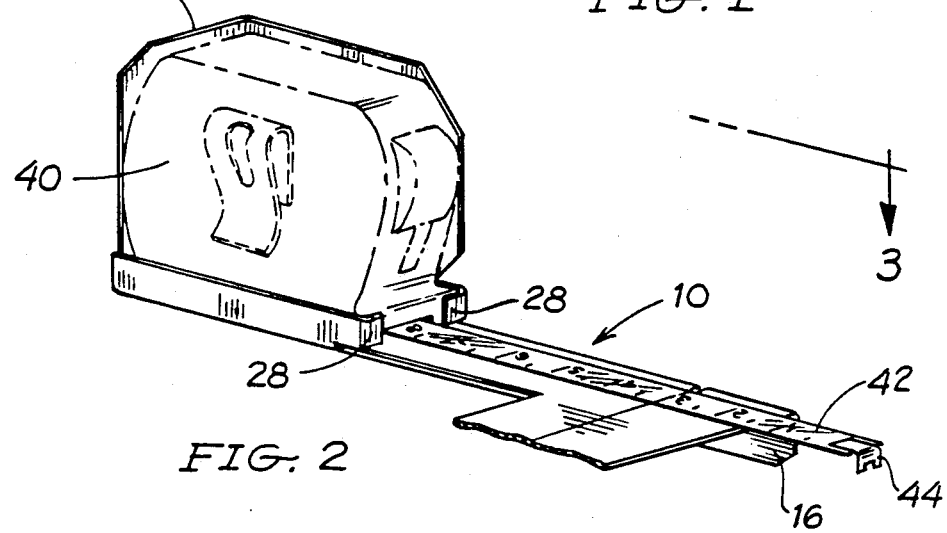
FIG. 2 is a perspective view of a portion of the device of FIG. 1 illustrating the way a standard tape measure fits in the head of the T-square.

FIG. 2 illustrates how a conventional tape measure case 40 fits in the receptacle 20 of FIG. 1. After insertion of a compatible tape measure through the hooks 28 to hold it in place snugly, the tape or blade 42 can be extracted by pulling on the end hook 44 according to normal practice without causing the tape measure to become separated from the T-square attachment 10 (which is only partially shown in the figure for simplicity). The tape is used by engaging the end hook 44 to the edge of a flat surface from which a certain distance is to be measured, as is normally done, and by pulling the tape measure T-square assembly away from it, thus causing the tape 42 to be extracted from its case 40 until the mark 46 on the tape corresponding to the desired distance is lined up with the notch 30 on the ruler. At this point the ruler is in place for marking two parallel lines along its edges 34 and 36, which are equidistant from the line 32 corresponding to the measured location. Inasmuch as the width of the ruler in the preferred embodiment of the invention is the same as the thickness of the lumber used for studs (approximately 1 and ½ inches in the United States), the two lines so marked along the edges 34 and 36 define the space within which a stud must be fastened in order to be perfectly positioned at the desired distance from a given point. Similarly, to the extent that the preferred length of the ruler is approximately 8 inches, the two lines will cover the entire width of both the top and bottom plate.

FIG. 3 illustrates the use of the T-square attachment of the invention in the construction of a wall. Two equal standard plates 50 are positioned wide face up adjacent to one another. The end hook 44 of the tape measure is engaged with the end 52 of the top plate and the T-square attachment is positioned with the lip 16 resting on the top edge 54 of the plate. By sliding the tape measure T-square assembly along the length of the plate, the tape is extracted to reflect the distance from the end 52. When the desired distance for positioning a stud is reached, as indicated by the tape marks lined up with the notch 30, both plates 50 can be marked simultaneously along the edges 34 and 36 of the ruler 12, thus delineating the perfect spot for the installation of the stud. The procedure is then repeated in sequence throughout the length of the plates to mark the locations for all of the studs planned for the wall. As a result of this operation, a carpenter generates two perfectly marked pieces of lumber, to be used as top and bottom plates, wherein each stud location is outlined in such a way that the centerline of each stud can be installed exactly at the desired point.

While the embodiment shown in the figures features the specific shapes therein described, the invention can obviously take other shapes with equivalent functionality and utility. In fact, any shape for the various components that retain the functional characteristics described above provides an acceptable apparatus to practice the invention. For instance, the T-square attachment could be constructed as the mirror image of the one shown in the figures, so that it could best suit left-handed people. Similarly, the receptacle 20 can be designed in various sizes and shapes to fit any of the commercially available tape measures. It might also be useful to mark the straight edges of the ruler with graduated markings to provide a means for measuring distances in that direction as well. It is anticipated that a small ridge, in the order of 3/16 to 5/16 of an inch, may be placed on the square to provide a slight elevation of the tape during use, so that a pencil may reach under it while marking the plates. Finally, a slit could be cut into the crosspiece along the inside edge of the ruler portion of the T-square in order to make it possible for a user to also mark the plates to a greater extent on that side of the ruler.

Although not shown in the figures, the T-square attachment of the invention could also comprise a hook for engagement with a belt or similar strap around the body of a user, so that it could be carried around with other tools. For best results, the hook would be placed on the outside of the working surfaces of the T-square in order not to interfere with its functioning while in use as described above. Finally, any rigid and minimally resilient material, such as plastic or metal, would be a suitable manufacturing material.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims, so as to embrace any and all equivalent apparatus and methods.

What I claim as my invention is:

1. A T-square attachment for use in combination with a retractable tape measure, comprising:

(a) a T-square structure, consisting of a ruler portion and a head portion, wherein said head portion includes a lip to provide a support for sliding and holding said T-structure in firm position against the edge of a straight surface, with a notch placed at the top of and along the centerline of said ruler portion in order to provide a reference mark; and (b) means located on said head portion for receiving and holding in place a retractable tape measure;

wherein the blade of said tape measure can be extracted perpendicularly to said ruler portion to a desired distance from a given point, as measured by matching the tape marks with said notch, and corresponding parallel lines can be marked along the edges of said ruler on said straight surface;

wherein said means located on said head portion for receiving and holding in place a retractable tape measure consists of a receptacle comprising a left side, a back side, and a right side, of shapes and dimensions suitable for housing a conventional tape measure snugly; and wherein said left and right sides include curved portions that form hooks for snapping and holding said tape measure in place.

2. The device described in claim 1, wherein said ruler portion is approximately 1 and ½ inches wide and approximately 8 inches long.

3. The device described in claim 1, wherein said ruler portion includes graduated markings along its straight edges to provide a means for measuring distances along said edges.

4. The device described in claim 1, further comprising a hook for engagement with a belt or similar strap around the body of a user.

5. The device described in claim 1, wherein said lip forms a right angle with and along the length of the top edge of said head portion.

* * * * *